US011332040B2

United States Patent
Übelacker et al.

(10) Patent No.: US 11,332,040 B2
(45) Date of Patent: May 17, 2022

(54) SEAT OCCUPANCY DETECTION WITH ACCELERATION SIGNAL

(71) Applicant: GRAMMER AG, Amberg (DE)

(72) Inventors: Roland Übelacker, Amberg (DE); Hubert Wittmann, Amberg (DE); Tobias Stahl, Amberg (DE)

(73) Assignee: GRAMMER AG, Ursensollen (DE)

( * ) Notice: Subject to any disclaimer, the term of this patent is extended or adjusted under 35 U.S.C. 154(b) by 257 days.

(21) Appl. No.: 16/774,204

(22) Filed: Jan. 28, 2020

(65) Prior Publication Data
US 2020/0238852 A1    Jul. 30, 2020

(30) Foreign Application Priority Data

Jan. 29, 2019 (DE) .......................... 102019102102.2

(51) Int. Cl.
| | | |
|---|---|---|
| *B60N 2/02* | (2006.01) | |
| *B60N 2/00* | (2006.01) | |
| *B60R 21/015* | (2006.01) | |
| *G01G 19/414* | (2006.01) | |

(52) U.S. Cl.
CPC ........ *B60N 2/002* (2013.01); *B60R 21/01516* (2014.10); *G01G 19/4142* (2013.01)

(58) Field of Classification Search
CPC .................... B60N 2/002; B60N 2/508; B60R 21/01512; B60R 21/01532; B60R 21/0156; B60R 21/01534
See application file for complete search history.

(56) References Cited

U.S. PATENT DOCUMENTS

| | | |
|---|---|---|
| 6,099,031 A | 8/2000 | Bischoff |
| 7,043,997 B2 | 5/2006 | Mattson et al. |
| 8,493,197 B2 | 7/2013 | Nakanishi et al. |
| 2003/0002690 A1 | 1/2003 | Breed et al. |
| 2005/0131607 A1 | 6/2005 | Breed |

(Continued)

FOREIGN PATENT DOCUMENTS

| | | |
|---|---|---|
| AU | 2013220935 | 8/2014 |
| CN | 1642788 | 7/2005 |

(Continued)

OTHER PUBLICATIONS

Ogino et al., Presence Detector and Safety Controller, Nov. 26, 1993, EPO, JP H05-312966 A, Machine Translation of Description (Year: 1993).*
Extended Search Report for European Patent Application No. 20152090.5, dated Jul. 6, 2020, 3 pages.

(Continued)

*Primary Examiner* — James A English
(74) *Attorney, Agent, or Firm* — Sheridan Ross P.C.

(57) ABSTRACT

The invention relates to a system for seat occupancy detection, comprising a vehicle seat for a driver with an upper part and at least one suspension-damper system, wherein an acceleration sensor is arranged on the upper part and is designed to detect a characteristic of an acceleration of the upper part as a function of a time, an evaluation unit being provided which is designed to generate an evaluation of the characteristic of the acceleration and optionally to transmit a signal to a higher-level control unit, the evaluation unit also being designed to assign the evaluation to one of several states, wherein the states are selected from a group comprising an occupied state and an unoccupied state of the vehicle seat.

20 Claims, 6 Drawing Sheets

(56) References Cited

U.S. PATENT DOCUMENTS

| | | | |
|---|---|---|---|
| 2006/0092023 | A1 | 5/2006 | Hofbeck et al. |
| 2007/0061102 | A1 | 3/2007 | Kim |
| 2007/0135982 | A1 | 6/2007 | Breed et al. |
| 2010/0213345 | A1 | 8/2010 | Haller |
| 2017/0305311 | A1 | 10/2017 | Haller et al. |
| 2018/0170213 | A1 | 6/2018 | Lu-Dac et al. |
| 2019/0054841 | A1 | 2/2019 | Cech et al. |
| 2019/0143843 | A1 | 5/2019 | Ubelacker et al. |
| 2019/0143844 | A1* | 5/2019 | Ubelacker .............. B60N 2/002 340/667 |
| 2019/0231272 | A1 | 8/2019 | Yamaji |
| 2019/0317622 | A1 | 10/2019 | Leigh et al. |
| 2020/0027288 | A1 | 1/2020 | Ubelacker |
| 2020/0238853 | A1 | 7/2020 | Ubelacker et al. |

FOREIGN PATENT DOCUMENTS

| | | | |
|---|---|---|---|
| CN | 101743147 | | 6/2010 |
| CN | 102826066 | | 12/2012 |
| CN | 105980216 | | 9/2016 |
| CN | 108693571 | | 10/2018 |
| CN | 109070836 | | 12/2018 |
| DE | 19547842 | | 6/1997 |
| DE | 10337992 | | 4/2005 |
| DE | 102004050884 | | 4/2006 |
| DE | 102006026705 | | 12/2007 |
| DE | 102009014354 | | 11/2009 |
| DE | 102017106949 | | 11/2017 |
| DE | 202018104878 | | 9/2018 |
| JP | 05312966 A | * | 11/1993 |
| JP | 2012-032312 | | 2/2012 |
| WO | WO 2014/085302 | | 6/2014 |
| WO | WO-2017198459 A1 | * | 11/2017 ............. A61B 5/024 |
| WO | WO 2018/073939 | | 4/2018 |

OTHER PUBLICATIONS

Official Action with machine translation for Japan Patent Application No. 2020-010689, dated Jun. 4, 2021, 6 pages.
Official Action with machine translation for Japan Patent Application No. 2020-010691, dated Jun. 4, 2021, 6 pages.
Official Action for U.S. Appl. No. 16/097,465, dated May 28, 2021 8 pages.
International Search Report prepared by the European Patent Office on Jun. 28, 2017, for International Application No. PCT/EP2017/060465.
Official Action for U.S. Appl. No. 16/097,465, dated Feb. 18, 2020 5 pages.
Official Action for U.S. Appl. No. 16/097,465, dated Jun. 18, 2020 5 pages.
Official Action for U.S. Appl. No. 16/097,465, dated Oct. 22, 2020 6 pages.
Official Action for U.S. Appl. No. 16/097,465, dated Feb. 1, 2021 6 pages.
Official Action for U.S. Appl. No. 16/774,217, dated Mar. 23, 2021 8 pages.
Extended Search Report for European Patent Application No. 20152100.2, dated Sep. 23, 2020, 3 pages.
Official Action for German Patent Application No. 102019102102.2, dated Sep. 2, 2019, 3 pages.
Official Action for German Patent Application No. DE 102019102105.7, dated Sep. 2, 2019, 3 pages.
Official Action with English Translation for China Patent Application No. 202010078552.X OA dated Dec. 1, 2021, 18 pages.
Official Action with English Translation for China Patent Application No. 202010078663.0, dated Dec. 3, 2021, 16 pages.
Official Action for U.S. Appl. No. 16/774,217, dated Oct. 4, 2021 10 pages.
Notice of Allowance for U.S. Appl. No. 16/774,217, dated Jan. 28, 2022 5 pages.

* cited by examiner

SEAT OCCUPANCY DETECTION WITH ACCELERATION SIGNAL

CROSS-REFERENCE TO RELATED APPLICATION

This application claims the benefit of German Patent Application No. DE 102019102102.2 filed Jan. 29, 2019, the entire disclosure of which is incorporated herein by reference in its entirety.

FIELD

The invention relates to a system for seat occupancy detection, comprising a vehicle seat for a driver with an upper part and at least one suspension-damper system, wherein an acceleration sensor is arranged on the upper part, which is designed to determine a characteristic of the acceleration of the upper part as a function of a time to be detected, an evaluation unit being provided which is designed to generate an evaluation of the characteristic of the acceleration and optionally to send a signal to a higher-level control unit.

BACKGROUND

Vibrations of the upper part of the vehicle seat, for example with respect to a vehicle floor, a lower part and/or the ground beneath the vehicle, occur almost always when the vehicle seat and/or the associated vehicle is in operation. These vibrations are influenced, for example, by the vibrations of components belonging to the vehicle (example engine) and by the state of the ground beneath the vehicle (example pothole). For the sake of simplicity, only uniaxial accelerations and vibrations in the height direction (z direction) of the vehicle seat are considered below; however, the underlying considerations also apply analogously to multi-axis vibration processes.

There are also safety regulations which stipulate that the vehicle or actuators or assemblies arranged on the vehicle must not be put into operation or must be switched to standby if the seat is not occupied. Such an assembly is, for example, a mower of a combine harvester. The background to this is the fear that, in the event of an unoccupied seat, the driver may be inadmissibly near the still active module in order to carry out maintenance work there, and the risk of injury is extremely high here. For example, the driver could injure himself while the mower is still running.

SUMMARY

The object of the present invention is therefore to enable automatic detection of the seat occupancy state, in order, inter alia, to minimize the risk of injury.

The object is achieved by a system for seat occupancy detection, comprising a vehicle seat for a driver with an upper part and at least one suspension-damper system, wherein an acceleration sensor is arranged on the upper part and is designed to detect a characteristic of an acceleration of the upper part as a function of a time, wherein an evaluation unit is provided which is adapted to generate an evaluation of the characteristic of the acceleration and, optionally, to transmit a signal to a higher-level control unit, wherein the evaluation unit is further adapted to associate the evaluation with one of several states, the states being selected from a group comprising an occupied state and an unoccupied state of the vehicle seat.

The present invention can be used, for example, in vehicle seats which are classically sprung, in which, for example, the upper part is resiliently mounted relative to a lower part. For example, it can also be used in vehicle seats in which the upper part is not resiliently supported relative to the lower part. Unless otherwise stated, the following explanations apply to both cases.

It is provided that the vehicle seat, for example below the acceleration sensor, has a suspension-damper system. In the case of classically sprung seats, this is formed, for example, by means of a suspension unit comprising at least one spring and/or at least one damper, which are preferably arranged between the upper part and the lower part; for example, this suspension-damper system is supported by a scissor-type frame. In seats in which the upper part is not resiliently supported relative to the lower part, this suspension-damper element is formed, for example, by means of the upholstery part and/or by means of the foam of the upholstery part.

In all vehicle seats, the acceleration is measured on the upper part, for example on a surface of an upholstery part of the upper part.

The characteristic of the acceleration over time can also be referred to as a vibration diagram. Vibrations are generally referred to as repeated temporal fluctuations in the state variables of a system. Fluctuation is to be understood as the deviation from an average. The state variables can be, for example, the deflection (path), the speed or the acceleration of the vibrating system.

This association can already determine whether the seat is occupied or not. If the seat is recognized as occupied, it is provided, for example, that a corresponding signal is sent from the evaluation unit to the higher-level control unit and/or that the actuators on the machine may remain in operation. If the seat is recognized as unoccupied, it is provided, for example, that a corresponding signal is sent to the higher-level control unit, whereupon the control unit can switch off the actuators on the machine. This increases driver safety.

This exploits the fact that the parameters on which the vibration diagram is based are characteristic of the vibration state of the seat.

Periodic vibrations have the property that their function values are repeated at regular intervals. The intervals between the occurrence of the same function values are called the period. If, for example, the acceleration is subject to a periodic oscillation, the same acceleration value is reached again after the duration of a period. The reciprocal 1/T of the period T is the frequency f (with the unit Hertz or Hz, where 1 Hz=1/s). The maximum fluctuation that occurs is called amplitude A.

In the case of an unoccupied vehicle seat (case 2), it can be observed, for example, that with the vehicle engine running, the vibrations caused by this are introduced into the upper part of the seat undamped by the suspension. The seat vibrates periodically with a certain frequency f2 and an amplitude A2. If the seat is occupied by a driver (case 1), it can be assumed in a simplified manner that the seat vibrates with an amplitude A1 and with a periodic frequency f1. It can be assumed that the driver damps the vibrations with his mass, so that the amplitude of the vibration drops (A1 is, for example, less than A2). It can also be assumed that the frequency drops, so that f1 is less than f2.

If a dead mass is now placed on the seat (case 3), it can be assumed in a simplified manner that the seat vibrates with an amplitude A3 and with a periodic frequency f3. It can be assumed that the dead mass damps the vibrations, so that the amplitude of the vibration drops compared to case 2 (A3 is, for example, less than A2). It can also be assumed that the frequency drops, so that f3 is less than f2. However, it can be assumed that the mass of the box, which is, for example, about 20 kg, is smaller than the mass of the driver, so that the decrease in amplitude and the decrease in frequency in case 3 is less than in case 1. Thus, the following applies: A1<A3<A2 and f1<f3<f2.

At the same time, it can be assumed that a driver behaves differently from the dead mass. In particular, the vibrations introduced are damped by the driver's limbs and muscles. In addition, the driver may be supported on the steering wheel or an arm support surface, which leads to a smaller influence of the mass of the driver in the vibration behaviour. Furthermore, the driver may make sudden movements, which are reflected in the vibration diagram as sudden accelerations.

It can therefore be assumed that the vibrations of a dead mass and a living driver will also differ if the weight of the two is the same.

It is provided, for example, that the evaluation comprises an amplitude spectrum of the characteristic of the acceleration, the evaluation unit also being designed to compare the amplitude spectrum with at least one temporally preceding amplitude spectrum and/or with at least one predefined amplitude spectrum.

In particular, the term "evaluation" is to be understood as meaning an evaluation based on the vibration diagram a(t) and/or an evaluation based on the associated amplitude spectrum a(f).

Here, use is made of the fact that harmonic vibration components can be read out relatively well from the amplitude spectrum of the vibration. For this purpose, an amplitude spectrum (also called a frequency spectrum) can be determined as an evaluation of the characteristic of the vibration, for example by means of a Fourier transformation or a fast Fourier transformation (FFT, Fast Fourier Transformation). A vibration signal is basically interpreted as a superposition of various individual signals. The resulting amplitude spectrum is therefore plotted against the frequency and has, for example, different spectral lines (peaks), each of which represents a measure of the amplitude and of the frequency of the individual signal in the period under consideration. The mathematics on which the FFT is based are known from the prior art and should not be considered in more detail within the scope of this invention.

In the simplest case, an amplitude spectrum of a simple sine wave has only one peak or a maximum peak with adjacent smaller peaks.

For example, the system also includes a data memory. For example, the data memory includes stored waveforms $a0(t)$ and $a60(t)$ as well as associated stored amplitude spectra $a0(f)$ and $a60(f)$, the index 0 in each case for an unoccupied seat and the index 60 in each case for a seat that is occupied by a driver of 60 kg.

It is also possible that the data memory has already analysed various characteristic values from these predefined vibration characteristics and associated amplitude spectra: With respect to the vibration a(t), a target value A00 for an amplitude of the unoccupied seat and a target value A60 for an amplitude of the seat, which is occupied by a driver of 60 kg. Furthermore, with respect to the amplitude spectrum a(f), the data memory includes a target value f00 for a frequency of the unoccupied seat and a target value f60 for a frequency of the seat which is occupied by a driver weighing 60 kg. It is also possible for the number of peaks and their spacing (in terms of time at a(t) or in terms of frequency at a(f)) of the specifications a(t) and a(f) to be stored.

In order to decide whether the seat is occupied or not, the evaluation unit can, for example, carry out a first evaluation of a(t) which compares the maximum deflection (amplitude A') of the acceleration a(t) in a certain period of time with a previous value or a nominal value of the amplitude stored in the data memory. If the evaluation unit determines that the amplitude A' and the target value A00 are the same, it is assumed that the seat is unoccupied. If the evaluation unit determines that the amplitude A' and the target value A60 are the same, it is assumed that the seat is occupied.

The evaluation unit can also perform a second evaluation of a(t), which provides for a comparison of the amplitude spectra. The maximum peaks and the associated frequencies are considered. The second evaluation thus provides, for example, the comparison of the frequency (f') of the amplitude spectrum a(f) belonging to a maximum peak within a certain period of time with a previous value or a target value of the frequency stored in the data memory. If the evaluation unit determines that the frequency f' and the target value f00 are the same, it is assumed that the seat is unoccupied. If the evaluation unit determines that the frequency f' and the target value f60 are the same, it is assumed that the seat is occupied.

It is also possible for the first and/or the second evaluation to carry out a comparison of the vibration diagrams of two different times t1 and t2. For example, let t1=0 and t2=10 s. A comparison of the amplitudes and/or the frequencies as described can also be carried out between these two diagrams.

It is of course possible for both the first evaluation and the second evaluation to allow the comparison to take place with a certain tolerance, so that, for example, the condition A'=A00 is affirmed on the part of the evaluation unit even if the actual value of A' is in a range from $(1-p)*A00$ to $(1+p)*A00$. For example, p is in a range from 0.01 to 0.1; and for example, p=0.05.

As described above, it is therefore advantageous according to a preferred embodiment if the evaluation unit is further configured to determine a deviation between a first frequency that can be assigned to a maximum peak of the determined amplitude spectrum and a second frequency that can be assigned to a maximum peak of the compared amplitude spectrum. This is useful, for example, to distinguish the unoccupied seat from the occupied seat.

In order to accelerate the detection of the seat occupancy again, it is provided according to a preferred variant of the system that the evaluation unit is further configured to assign the evaluation to one of several processes, the processes being selected from a group which comprises occupying the vehicle seat and leaving of the vehicle seat by the driver.

By assigning whether such a process takes place, it can be concluded whether the seat is currently occupied or is being left. The status of the seat can then be derived from this again.

As is known, occupying a seat and leaving the seat cause strong vibrations, so that the maximum amplitude of such a vibration will differ significantly from the maximum amplitude of an unoccupied or already occupied, that is to say a steady, seat.

Furthermore, it is advantageous if the evaluation unit is also designed to determine a deviation of a number of peaks and frequencies that can be assigned to these peaks between the determined amplitude spectrum and the compared amplitude spectrum. This is particularly useful in distinguishing at least one of the "occupying the vehicle seat" and "leaving the vehicle seat" processes from at least one of the "occupied state" and "unoccupied state" states of the vehicle seat, since the two processes each show, for example, an amplitude spectrum which shows several smaller peaks at different frequencies, which can be clearly distinguished with one peak or the maximum peak with surrounding peaks. The evaluation unit therefore assumes that one of the two processes takes place if, for example, the number n' of the peaks of the current amplitude spectrum is greater than the number n0 (amplitude spectrum with an unoccupied seat) and greater than the number n60 (amplitude spectrum with an occupied seat with driver weighing 60 kg).

It is therefore advantageous if the evaluation unit is also designed to evaluate the characteristic of the acceleration and to compare it with at least one previous characteristic and/or with at least one predetermined characteristic. Various statements can be determined from this curve a(t). For example, a maximum value of the amplitude in a certain period of time can be compared in different diagrams or with target values (analogous to the procedure described above). It is also possible to distinguish the two processes "occupying" and "leaving" the seat based on the time interval of the peaks depending on their value: for example, it is assumed that the diagram a(t) of the "occupying" process has a maximum peak which occurs before several smaller peaks. It is also assumed that the diagram a(t) of the "leaving" process has a maximum peak which occurs before several smaller peaks.

In order to facilitate the above-mentioned assignments, it can also be provided that the evaluation comprises the creation of an envelope curve of a characteristic a(t). This envelope curve can then be compared with specified or previous envelope curves as described. The envelope curve is also called "envelope" and describes the characteristic of the amplitude in the case of vibrations. For example, the values of the characteristic a(t) at the amplitudes which represent the maxima of the vibration a(t), are marked as points (the minima are initially ignored). Then these points are connected one after the other, so that an envelope curve results. The envelope curve can be compared, for example, in terms of its characteristic (falling in a certain period of time, for example, falling when "getting in" and increasing when "leaving") or its steadiness (steady in the described states and non-steady in the described processes). The expression "continuity" should be interpreted here with regard to its mathematical interpretation; expressed clearly, a function is continuous if it does not "jump".

The object of the invention is also achieved by a method for seat occupancy detection within a system, the system comprising a vehicle seat for a driver with an upper part and at least one suspension-damper system, an acceleration sensor arranged on the upper part and an evaluation unit, comprising the following steps:

(101) detecting a characteristic of an acceleration of the upper part as a function of a time by the acceleration sensor, (102) creating an evaluation of the characteristic of the acceleration by the evaluation unit, (103) comparison of the evaluation with the evaluation of a previous characteristic or with a predefined evaluation, (104) assigning the evaluation to one of a plurality of processes, the processes being selected from a group which comprises occupying the vehicle seat and leaving the vehicle seat by the driver, or (105) assigning the evaluation to one of a plurality of states, the states being selected from a group comprising an occupied state and an unoccupied state of the vehicle seat, (106) repetition of steps (101) to (105) up to a predefinable termination criterion.

The method according to the invention applies in particular to a system according to one of the system claims. All of the exemplary embodiments described in connection with the system according to the invention and their advantages also apply advantageously to the method according to the invention.

It should be mentioned that the terms "sitting" and "occupying" each describe the same process according to which a driver takes a seat on the seat. It should also be mentioned that the terms "leaving" and "getting up" each describe the same process according to which a driver leaves the seat.

BRIEF DESCRIPTION OF THE DRAWINGS

Further advantages, goals and features of the present invention are explained with reference to the accompanying drawings and the following description, in which different embodiments of the vehicle seat according to the invention are shown and described by way of example. In the drawings.

DETAILED DESCRIPTION

Figure 1A:
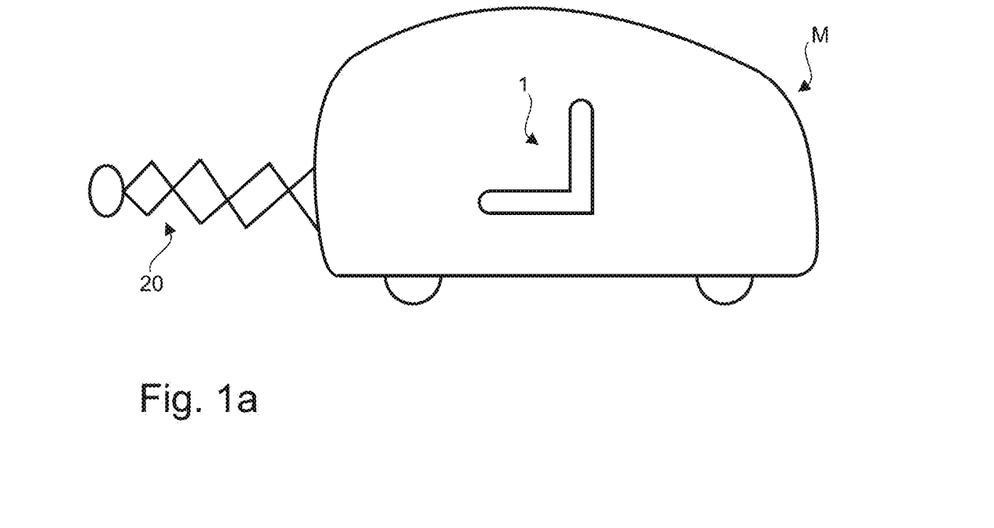
FIG. 1a shows a schematic representation of a vehicle with a vehicle seat and an actuator.

According to FIG. 1a, a vehicle M with a vehicle seat 1 and an actuator 20 is shown in a highly simplified manner. For example, the vehicle M is a combine harvester and the actuator 20 is the associated mower.

Figure 1B:
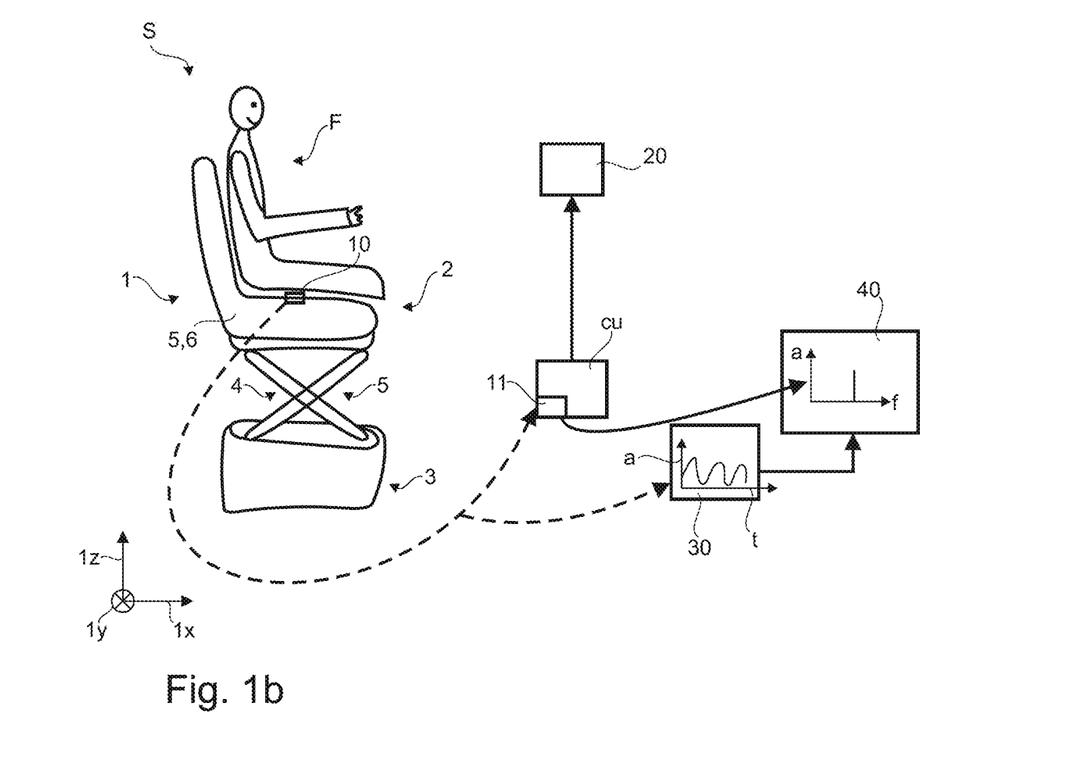
FIG. 1b shows a schematic representation of a system according to the invention.

FIG. 1b shows a system (S) for recognizing seat occupancy comprising the vehicle seat (1) for a driver (F) with an upper part (2) and a suspension-damper system (5). In the present case, the upper part (2) is resiliently supported relative to the lower part (3) of the vehicle seat (1) by means of a scissor-type frame 4, which is supported, for example, by suspension elements and damping elements of the suspension-damper system (5), which are not shown. It would also be conceivable that the scissors-type frame (4) is dispensed with and the suspension-damper system (5) is formed by means of the upholstery part (6) of the upper part (2).

For illustration purposes, a Cartesian coordinate system with the axes $1x$ (longitudinal direction of the seat), $1y$ (width direction of the seat) and $1z$ (height direction of the seat) is shown.

An acceleration sensor (10) is arranged on the upper part 2, in this case on the upholstery part (6) of the upper part 2, which is designed to detect a characteristic of an acceleration (a) of the upper part (2) as a function of a time (t). An example of a resulting configuration is shown as diagram 30. In the present case, this acceleration sensor (10) sends the detected characteristic to an evaluation unit (11).

In the present case, the evaluation unit (11) is designed to produce an evaluation (a') of the characteristic (a(t)) of the acceleration (a) and to send a signal to a higher-level control unit (CU). In the present case, the evaluation is designed as an amplitude spectrum a(f) and is shown as an example in the diagram 40.

The evaluation unit (11) is now designed to assign the evaluation (a') to one of several states (J1, J2), the states (J1, J2) being selected from a group which comprises an occupied state (J1) and an unoccupied state (J2) of the vehicle seat (1). For example, the evaluation unit recognizes in the present case that the vehicle seat 1 is occupied by the driver F, who has a mass of 60 kg.

On the basis of the signals from the evaluation unit 11, the control unit (CU) can decide whether or not it sends a signal to the actuator 20 that changes its state. In the present case, the driver F is on the vehicle seat 1 and thus outside the danger zone of the actuator 20, so that, for example, there is no signal from the control unit (CU) to the actuator 20, or a signal with which the actuator 20 can be put into operation.

Figure 2:
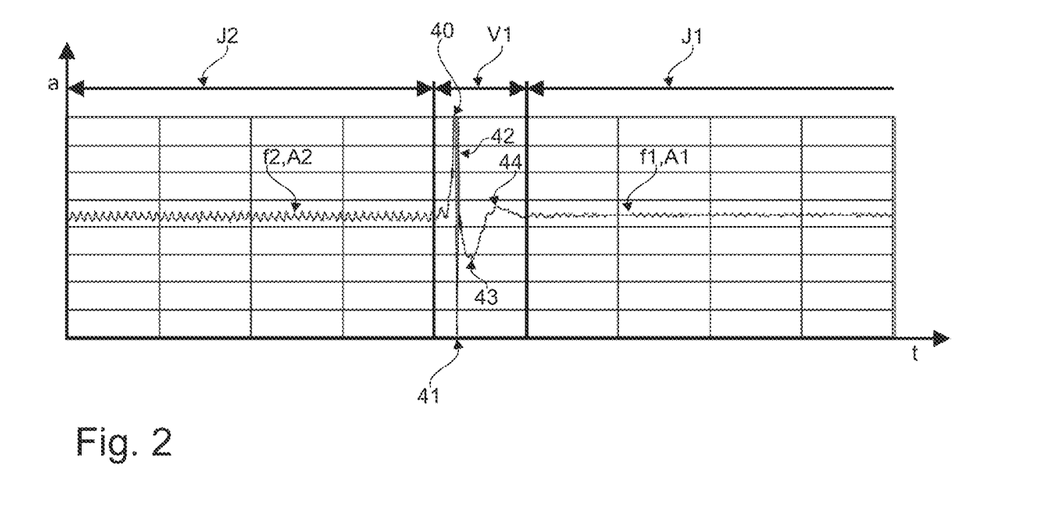
FIG. 2 shows an example of a characteristic a(t)

FIG. 2 now shows a vibration characteristic a(t) with three temporally different sections, which can be assigned to the states J2 or J1 and the process V1 after an evaluation. For example, the first section is to be assigned to state J2, that is to say the unoccupied vehicle seat. The seat 1 vibrates essentially periodically with a certain frequency f2 and an amplitude A2. In the third section, the seat 1 is occupied by a driver F, so that the seat 1 vibrates with an amplitude A1 and with a periodic frequency f1. It is important here that A1 is less than A2, which can be immediately read from the diagram, and that f1 is smaller than f2 (see also FIG. 5 here for evaluation).

The middle section now has a maximum peak 40 and, in chronological order, several smaller peaks 41-44. Based on this specific pattern, the evaluation unit 11 is now able to assign this middle section to the process V1, that is to say the sitting of a driver F in the seat 1.

Figure 3A:
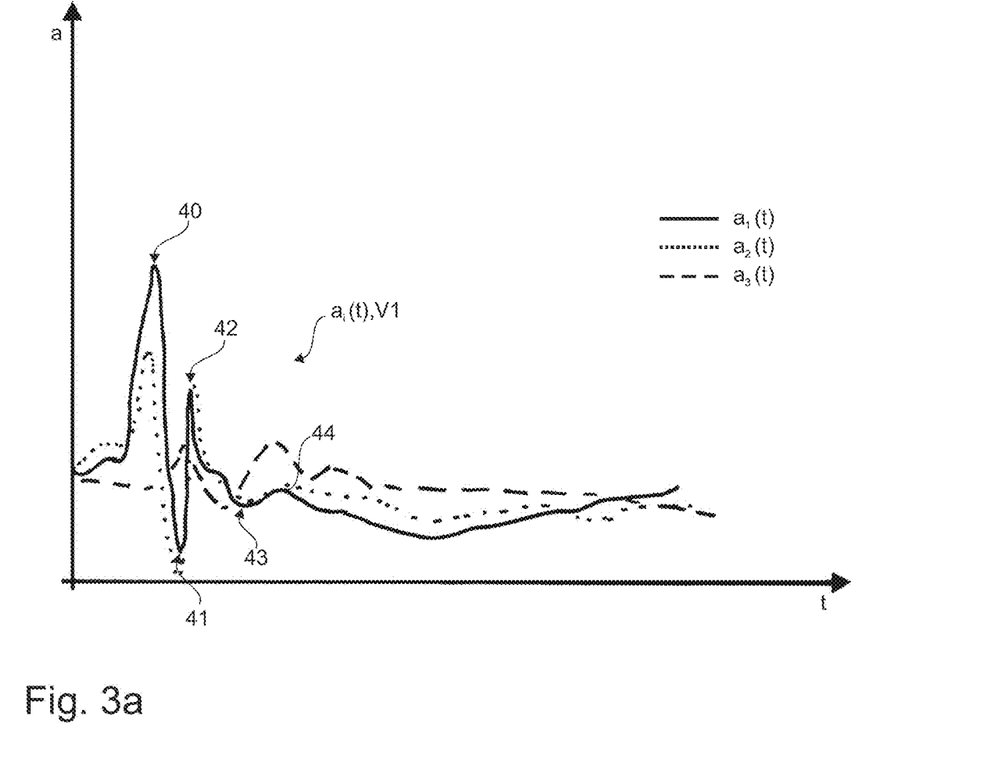
FIG. 3a, 3c show characteristics a(t) of the process "sitting"
Figure 3B:
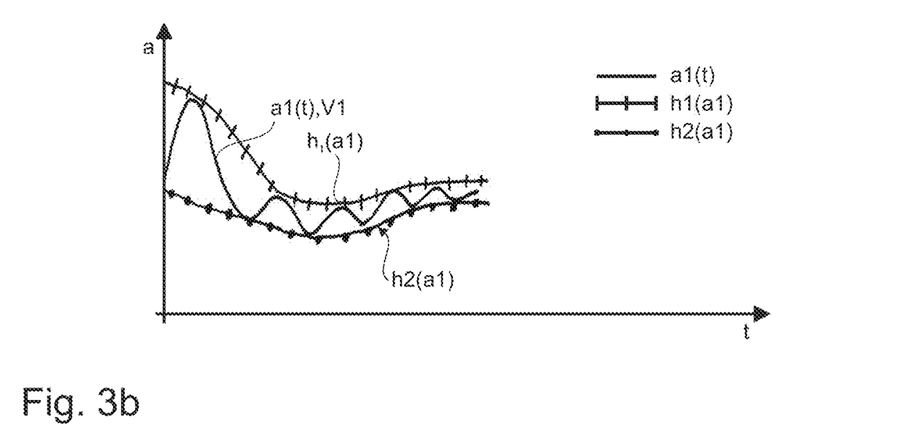
FIG. 3b shows a representation of one of the characteristics from FIG. 3a together with the associated envelope curve.
Figure 4A:
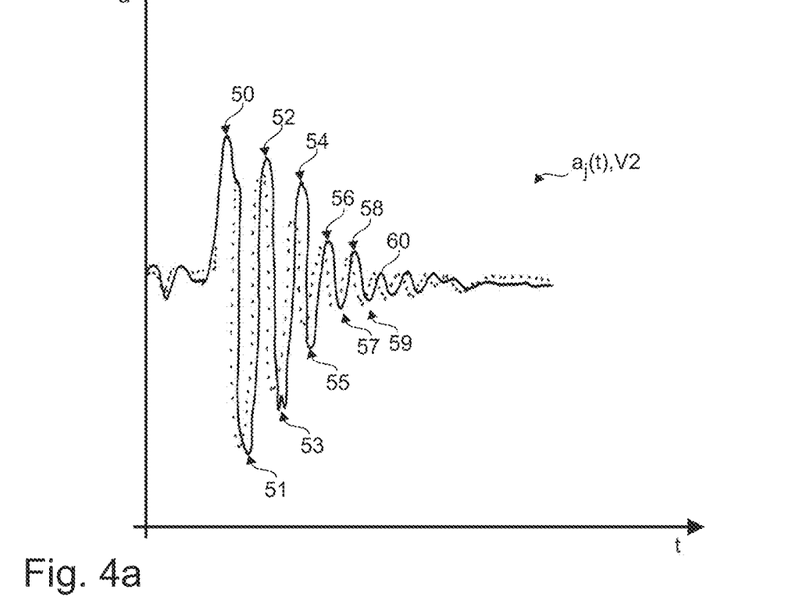
FIG. 4a, 4c show characteristics a(t) of the "leaving" process.
Figure 4B:
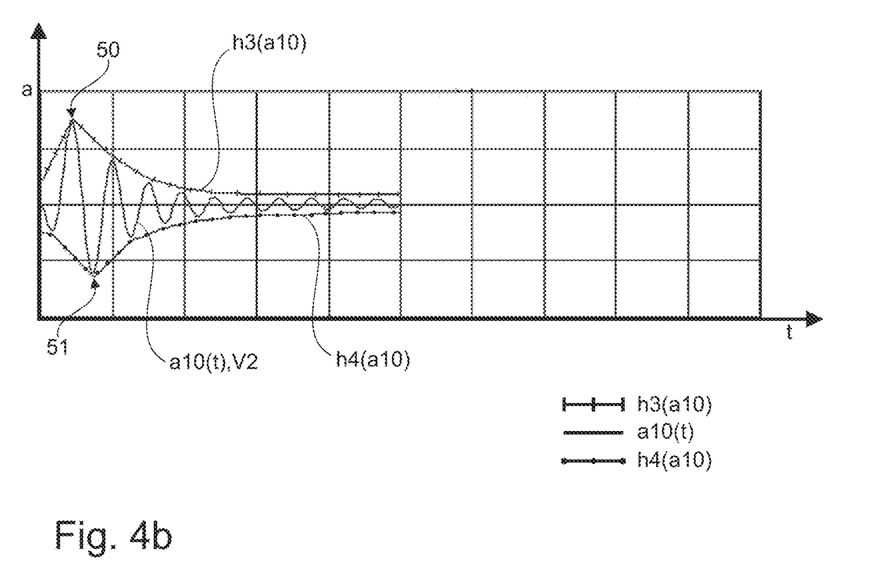
FIG. 4b shows a representation of one of the characteristics from FIG. 4a together with the associated envelope curve.

FIGS. 3a and 4a now show several detected characteristics ai(t) and aj(t), as they occur in each case when sitting (FIG. 3a) or when leaving (FIG. 4a). FIGS. 3b and 4b each show an a1(t), a10(t) of these characteristics ai(t) and aj(t) as well as the envelope curves h1 and h3 thereof for the maximum values ("positive amplitudes") and h3 and h4 for the minimum values ("negative amplitudes").

It should be noted that the process V1 leads to a much "more restless" vibration characteristic: The mass of the driver F vibrates for a long time, so that the steady state is only reached after a certain time interval. The positive peaks 40, 42, 44 relative to one another and the negative peaks 41, 43, 45 relative to one another exhibit a relatively large difference. The two envelope curves h1 and h2 are not designed to fall or rise evenly.

It should also be noted that the process V2 leads to a much "smoother" vibration curve: As soon as the mass of the driver F has left the seat 1, the seat swings quickly in terms of time to state J2. The positive peaks 50, 52, 54, 56, 58, 60 relative to one another and the negative peaks 51, 53, 55, 57, 59 relative to one another exhibit a smaller difference. From the maximum peak 50 and the peak 51, the two envelope curves h3 and h4 are essentially falling (h3) or rising (h4).

Figure 3C:
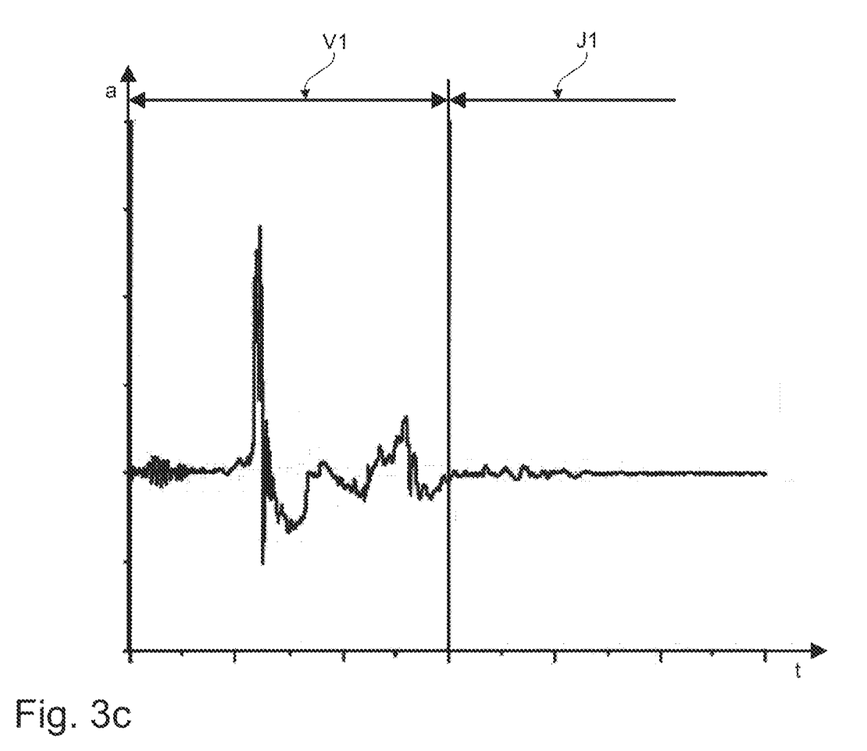
Figure 4C:
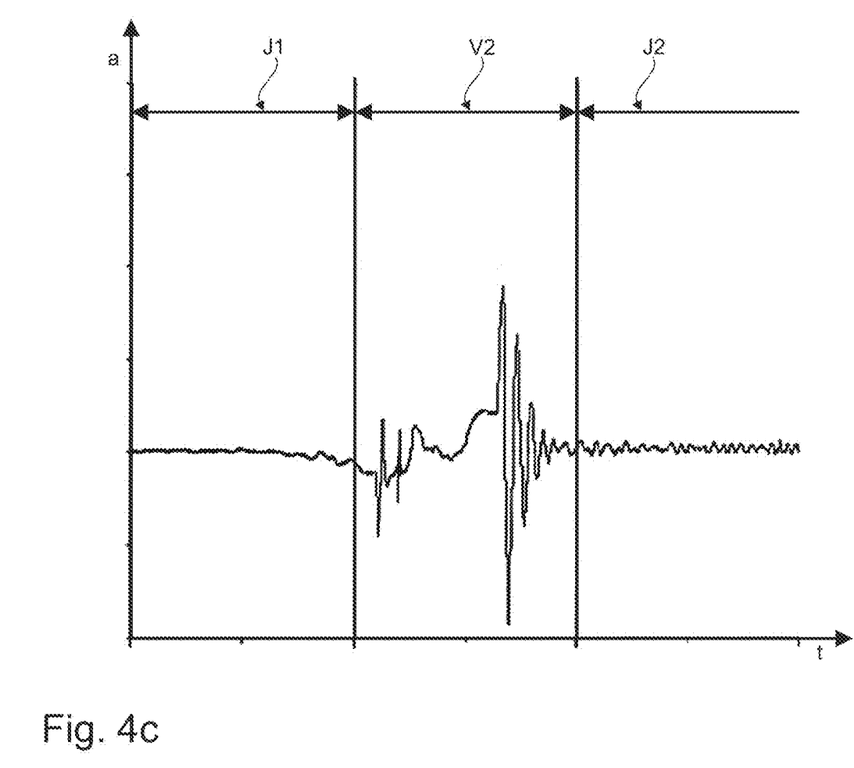

FIGS. 3c and 4c again show characteristics of processes V1 (FIG. 3c) and V2 (FIG. 4c).

Figure 5:
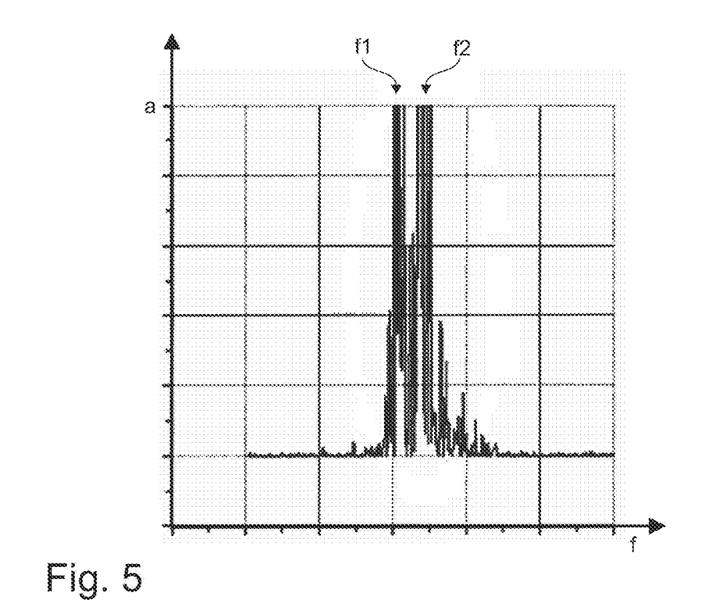
FIG. 5 shows an amplitude spectrum a(f) resulting from the characteristic of FIG. 2.

Using an FFT, an amplitude spectrum a(f) (without taking into account section V1) was calculated from the characteristic of the curve in accordance with FIG. 2 and represented in accordance with FIG. 5. It can be seen that several peaks accumulate around two frequencies f1 and f2. This again clearly shows that the frequency f2 of the unoccupied seat differs significantly from the frequency f1 of the occupied seat; a comparison of the two by the evaluation unit 11 can thus serve as a basis for making a decision for the assignment of the state.

Figure 6:
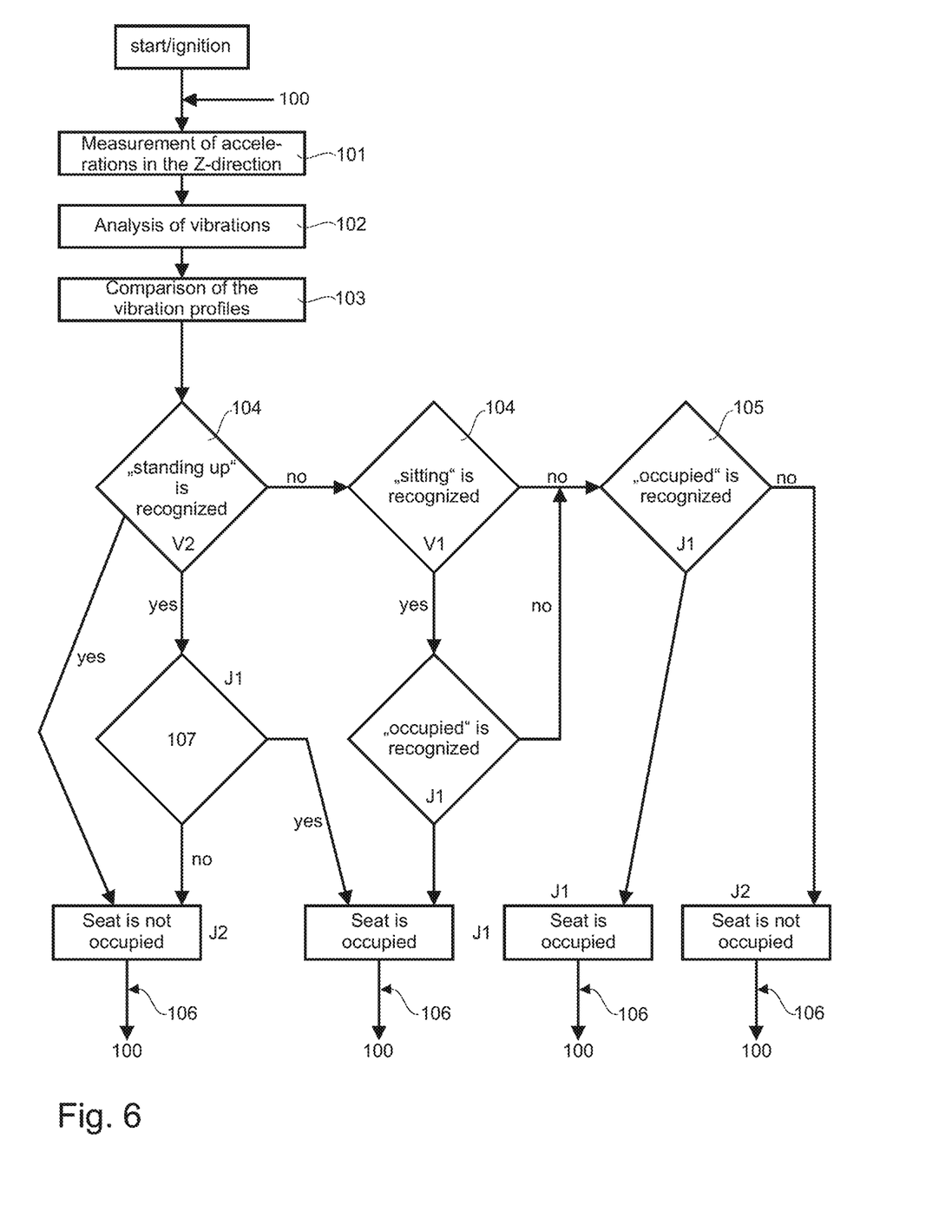
FIG. 6 shows a preferred sequence of the method according to the invention.

FIG. 6 shows a preferred characteristic of the method 100 according to the invention for seat occupancy detection within a system (S), the system (S) comprising a vehicle seat (1) for a driver (F) with an upper part (2) and at least one suspension-damper system (5), an acceleration sensor (10) arranged on the upper part (2), and an evaluation unit (11). After the engine has started, the embodiment of the method 100 shown comprises the following steps:

(101) detecting a characteristic (a(t)) of an acceleration (a) of the upper part (2) as a function of a time (t) by the acceleration sensor (10), (102) creating an evaluation (a') of the characteristic (a(t)) of the acceleration (a) by the evaluation unit (11), (103) comparing the evaluation (a') with the evaluation (a-1') of a chronologically preceding characteristic (a(t)) or with a predefined evaluation (a0'), (104) assignment of the evaluation (a') to one of several processes (V1, V2), the processes (V1, V2) being selected from a group which includes occupying (V1) the vehicle seat (1) and leaving (V2) the vehicle seat (1) by the driver (F), or (105) assigning the evaluation (a') to one of several states (J1, J2), the states (J1, J2) being selected from a group which comprises an occupied state (J1) and an unoccupied state (J2) of the vehicle seat (1), (106) repetition of steps (101) to (105) up to a predefinable termination criterion.

In the present case, it is first checked whether standing up V2 is detected. If no, it is checked whether sitting V1 is detected. If no, it is checked whether the status "occupied J1" is recognized.

Alternatively, it can be provided that it is checked in step 105 whether the "unoccupied J2" state is recognized.

Also shown is a step (107) which, after determining the "standing up", is intended to ensure that, for example, driving over a pothole was not incorrectly assigned to a standing up process V2. This step (107) checks whether "seat occupied, J1" is recognized. If not, the previous assumption was correct and the seat is actually not occupied. If yes, it is assumed that the assignment was wrong; the state J1 is determined.

It is understood that the embodiment explained above is merely an initial configuration of the system S according to the invention and of the method 100 according to the invention. In this respect, the configuration of the invention is not limited to this embodiment.

All the features disclosed in the application documents are claimed as being essential to the invention, provided that, individually or in combination, they are novel over the prior art.

LIST OF REFERENCE SIGNS 1 vehicle seat
1x longitudinal direction of the seat
1y width direction of the seat
1z height direction of the seat 2 upper part
3 lower part
4 scissor-type frame
5 suspension-damper system
6 upholstered part
10 acceleration sensor
11 evaluation unit
20 actuator
30, 40 diagram
40-44, 50-60 peaks
100 method
101-107 step
a, a(t), ai(t), aj(t), a1($t$), a10($t$) acceleration
a' evaluation
CU control unit
f frequency
F driver
h1-h4 envelope curve
J1, J2 state
M vehicle
S system
t time

The invention claimed is:

1. A system for seat occupancy detection, the system comprising:
a vehicle seat for a driver with an upper part;
at least one suspension-damper system; and
an acceleration sensor being arranged on the upper part and designed to detect a characteristic of an acceleration of the upper part as a function of a time,
wherein an evaluation unit is provided which is designed to create an evaluation of the characteristic of the acceleration and to transmit a signal to a higher-level control unit,
wherein the evaluation unit is designed to assign the evaluation to one of several states, the several states being selected from a group comprising an occupied state and an unoccupied state of the vehicle seat, and
wherein the evaluation unit generates an envelope curve of the characteristic of the acceleration of the upper part.

2. The system according to claim 1,
wherein the evaluation unit is further configured to assign the evaluation to one of several processes, the several processes being selected from a group which comprises occupying the vehicle seat and leaving the vehicle seat by the driver.

3. The system according to claim 1,
wherein the evaluation comprises an amplitude spectrum of the characteristic of the acceleration, and
wherein the evaluation unit is designed to compare the amplitude spectrum with at least one of at least one temporally preceding amplitude spectrum or with at least one predetermined amplitude spectrum.

4. The system according to claim 3,
wherein the evaluation unit is designed to detect a deviation between a first frequency which can be assigned to a first maximum peak of the at least one predetermined amplitude spectrum and a second frequency which can be assigned to a second maximum peak of the compared amplitude spectrum.

5. The system according to claim 3,
wherein the evaluation unit is further configured to detect a deviation of at least one of a number of peaks or a number of frequencies assignable to the number of peaks between the at least one predetermined amplitude spectrum and the compared amplitude spectrum.

6. The system according to claim 1,
wherein the evaluation unit is further configured to evaluate the characteristic of the acceleration and compare the characteristic of the acceleration with at least one of at least one previous characteristic or with at least one predetermined characteristic.

7. A method for seat occupancy detection within a system, the system comprising a vehicle seat for a driver with an upper part and at least one suspension-damper system, an acceleration sensor arranged on the upper part and an evaluation unit, the method comprising:
detecting a characteristic of an acceleration of the upper part as a function of a time by the acceleration sensor;
creating an evaluation of the characteristic of the acceleration by the evaluation unit;
generating an envelope curve of the characteristic of the acceleration of the upper part by the evaluation unit;
comparing the evaluation with an evaluation of a chronologically preceding characteristic or with a predetermined evaluation;
assigning the evaluation to one of several processes, the processes being selected from a group which comprises occupying the vehicle seat and leaving the vehicle seat by the driver;
assigning the evaluation to one of several states, the states being selected from a group which comprises an occupied state and an unoccupied state of the vehicle seat; and
repeating the above steps to up to a predefinable termination criterion.

8. The method according to claim 7, wherein the evaluation comprises an amplitude spectrum of the characteristic of the acceleration, and wherein the method further comprises:
comparing, by the evaluation unit, the amplitude spectrum with at least one of at least one temporally preceding amplitude spectrum or at least one predetermined amplitude spectrum.

9. The method according to claim 8, further comprising:
detecting, by the evaluation unit, a deviation between a first frequency assigned to a maximum peak of the predetermined amplitude spectrum and a second frequency assigned to a maximum peak of the compared amplitude spectrum.

10. The method according to claim 8, further comprising:
detecting, by the evaluation unit, a deviation of at least one of a number of peaks or a number of frequencies assignable to the number of peaks between the at least one predetermined amplitude spectrum and the compared amplitude spectrum.

11. The method according to claim 7, further comprising:
evaluating, by the evaluation unit, the characteristic of the acceleration and compare the evaluated characteristic with at least one of at least one previous characteristic or at least one predetermined characteristic.

12. A system for seat occupancy detection, the system comprising:
a vehicle seat including an upper part and a lower part;
a suspension-damper system;
an acceleration sensor disposed on the upper part of the vehicle seat, the acceleration sensor configured to detect a characteristic of an acceleration of the upper part as a function of time; and an evaluation unit that creates an evaluation of the characteristic of the acceleration and transmits a signal to a higher-level control unit, wherein the evaluation unit assigns the evaluation to a first state of a plurality of states, the plurality of states including an occupied state and an unoccupied state of the vehicle seat, and wherein the evaluation unit generates an envelope curve of the characteristic of the acceleration of the upper part.

13. The system according to claim 12,
wherein the evaluation unit assigns the evaluation to a first process of a plurality of processes, the plurality of processes including entering the vehicle seat by a driver and leaving the vehicle seat by the driver.

14. The system according to claim 12,
wherein the evaluation includes an amplitude spectrum, and
wherein the evaluation unit compares the amplitude spectrum with at least one of: at least one temporally preceding amplitude spectrum or at least one predetermined amplitude spectrum.

15. The system according to claim 14,
wherein the evaluation unit detects a deviation between a first frequency assigned to a first maximum peak of the at least one predetermined amplitude spectrum and a second frequency assigned to a second maximum peak of the compared amplitude spectrum.

16. The system according to claim 14,
wherein the evaluation unit detects a deviation of at least one of a number of peaks or a number of frequencies assignable to the number of peaks between the at least one predetermined amplitude spectrum and the compared amplitude spectrum.

17. The system according to claim 12,
wherein the evaluation unit evaluates the characteristic of the acceleration and compares the characteristic of the acceleration with at least one of at least one previous characteristic or with at least one predetermined characteristic.

18. The system according to claim 1,
wherein the higher-level control unit, upon receiving the transmitted signal, switches off one or more vehicle actuators.

19. The method according to claim 7, further comprising:
transmitting, to a higher-level control unit, a signal; and
switching off, by the higher-level control unit upon receiving the transmitted signal, one or more vehicle actuators.

20. The system according to claim 12,
wherein the higher-level control unit, upon receiving the transmitted signal, switches off one or more vehicle actuators.

* * * * *